(12) United States Patent
Shelton et al.

(10) Patent No.: US 7,932,469 B1
(45) Date of Patent: Apr. 26, 2011

(54) METALLIC WIRE TRACER ELEMENT INCLUDING WOVEN PROTECTIVE TUBE AND METHODS OF MAKING SAME

(75) Inventors: Larry N. Shelton, Warwick, RI (US); Barbara P. Cioffi, Johnston, RI (US); Paul S. Mcclellan, Jr., Hickory, NC (US)

(73) Assignee: Neptco, Inc., Pawtucket, RI (US)

( * ) Notice: Subject to any disclaimer, the term of this patent is extended or adjusted under 35 U.S.C. 154(b) by 0 days.

(21) Appl. No.: 12/762,279

(22) Filed: Apr. 16, 2010

Related U.S. Application Data

(60) Provisional application No. 61/254,352, filed on Oct. 23, 2009.

(51) Int. Cl.
*H01B 7/08* (2006.01)
(52) U.S. Cl. .............................. 174/117 M; 174/120 R
(58) Field of Classification Search .............. 174/117 M, 174/120 R
See application file for complete search history.

(56) References Cited

U.S. PATENT DOCUMENTS

| | | | |
|---|---|---|---|
| 2,009,004 A | 7/1935 | Schatzel | |
| 2,178,365 A | 10/1939 | Brobst | |
| 3,217,084 A * | 11/1965 | Feick, III | ..... 174/25 R |
| 3,568,626 A | 3/1971 | Southworth, Jr. | |
| 3,669,157 A * | 6/1972 | Woodall et al. | ..... 139/387 R |
| 4,045,611 A | 8/1977 | Torgerson | |
| 4,500,578 A * | 2/1985 | van de Kamp | ..... 428/36.1 |
| 4,754,685 A | 7/1988 | Kite et al. | |
| 4,767,237 A | 8/1988 | Cosman et al. | |
| 4,791,245 A | 12/1988 | Thornley | |
| 4,949,664 A | 8/1990 | Wallace | |
| 5,843,542 A * | 12/1998 | Brushafer et al. | ..... 428/36.1 |
| 5,991,013 A | 11/1999 | Eslambolchi et al. | |
| 6,005,191 A | 12/1999 | Tzeng et al. | |
| 6,127,632 A * | 10/2000 | Oswald et al. | ..... 174/120 R |
| 6,265,039 B1 * | 7/2001 | Drinkwater et al. | ..... 428/36.1 |
| 6,500,541 B1 * | 12/2002 | Schoeck et al. | ..... 428/372 |
| 6,737,574 B2 | 5/2004 | Sylvia et al. | |
| 6,750,401 B2 | 6/2004 | Vokey | |
| 6,844,500 B2 | 1/2005 | Williams et al. | |
| 6,924,428 B1 | 8/2005 | Payne et al. | |
| 7,425,676 B2 | 9/2008 | Eng | |
| 2004/0216908 A1 | 11/2004 | Yen | |
| 2007/0210490 A1 * | 9/2007 | Malloy et al. | ..... 264/425 |
| 2009/0050225 A1 | 2/2009 | Thomas | |

* cited by examiner

*Primary Examiner* — Chau N Nguyen
(74) *Attorney, Agent, or Firm* — Mintz Levin Cohn Ferris Glovsky and Popeo, P.C.

(57) ABSTRACT

A detectable tracer element for use in underground detection applications includes a metallic wire, a non-fibrous insulating jacket integral with the wire, and a flexible, cut-resistant, non-electrically shielding woven protective tube surrounding the wire and jacket combination. The woven protective tube includes a plurality of non-metallic fibers woven around the wire and jacket combination such that the combination is disposed within the interior of the protective tube. In one configuration of the invention, the woven protective tube defines a substantially oval or circular tube weave. The substantially oval or circular tube weave is woven, such that, the tube weave is pulled or stitched into a flattened configuration for use in underground applications.

17 Claims, 4 Drawing Sheets

METALLIC WIRE TRACER ELEMENT INCLUDING WOVEN PROTECTIVE TUBE AND METHODS OF MAKING SAME

RELATED APPLICATIONS

This nonprovisional patent application claims priority to U.S. provisional patent application Ser. No. 61/254,352, filed Oct. 23, 2009, the disclosure of which is incorporated herein in its entirety by reference.

FIELD OF THE INVENTION

The invention relates to a metallic wire tracer element having a woven protective tube for use in underground detection applications.

BACKGROUND OF THE INVENTION

Direct-buried cable is a type of communications or transmissions cable that is manufactured for installation under the ground and in direct contact with the earth without any covering, sheathing, or piping to protect the cable. Direct-buried cable is easier and less expensive to lay under the ground than other cable designs that require protection from the earth and, therefore, are attractive to telecommunications companies. Direct-buried cable includes coaxial and bundled fiber optic cable, and some power cabling. Installations of direct-buried cable typically place cable in trenches at depths of, for instance, from about 30 to 45 inches in order to help to avoid or limit exposure of the cable to corrosion and excavation damage. Direct-buried installations are often combined with cable duct installations.

Without any protective covering or cable duct, direct-buried cable is more susceptible than ducted or sheathed cable to being cut during installation back-fill, digging, or excavation, as well as being damaged due to corrosion. Therefore, means of detecting and identifying the location of trenches and thereby the location of direct-buried cable are necessary to excavate cable for field repair or for removal and replacement.

In addition, means of detecting and tracking cable paths and routes are needed before the installation of new cable or re-routing of existing cable installations. Detection means are also essential for locating existing cable installations and to ensure project plans properly delineate cable tracks to avoid accidents related to undetected utility lines or other hazardous underground structures. Detection means can be useful in configuring and locating cable splice sites and transition points between direct-buried sections and duct/conduit sections of cable. Finally, detection means are helpful and in some cases essential for locating underground structures and underground utility lines, including, for instance, electrical, gas, water, and sewage lines.

Prior art means for detection of direct-buried cable include direct-buried copper clad steel wire including an insulating polyethylene jacket. A well-known copper-clad steel wire includes two conductors referred to in the art as "C-wire," which is laid directly in trenches proximate to direct-buried cable. The copper-clad steel wire includes a core of steel with a copper jacket and a polyethylene insulating jacket that encases the core. The copper-clad steel wire is relatively rigid due to its steel construction and, therefore, is inflexible. While the rugged construction of a copper-clad steel wire can help to provide some desirable mechanical properties, if the copper jacket is breached due to, for instance, damage from back filling during installation or digging during excavation, signal conductivity is lost and corrosion of the inner steel wire is accelerated. In addition, in these instances, any electrical isolation between the steel wire and the ground is no longer maintained. The copper-clad steel wire is particularly less resistant to damage along its exterior because the steel wire demonstrates an anvil effect due to its higher modulus of elasticity (than copper or aluminum). The steel wire helps to create a cutting force or peak pressure at the site of a force or an impact against its exterior that thereby facilitates a breach of the polyethylene and copper-clad jackets.

In addition, due to the magnetic permeability of the steel core of a bi-metallic wire, high frequency electrical signals migrate to and travel along the copper surface of the steel wire, rather than within the steel core. This creates what is referred to in the art as the "skin effect." The skin effect increases the wire impedance and reduces the signal applied to the wire. This effect in turn reduces the signal transmitted to a remote device typically used to locate the wire and thereby to locate buried cable or cable routes. In these cases, the wire's conductivity is reduced significantly and its usefulness in locating buried cable is compromised.

Thus, it is highly desirable to have a tracer element for reliable detection of the placement and location of direct-buried cable, as well as placement and location of other utility delivery lines, that is relatively flexible to help to facilitate installation. It is also desirable to have a tracer element that demonstrates strength and resistance to a force or an impact to its exterior to help to minimize or eliminate the tracer element's susceptibility to breach during, for instance, installation, back filling or excavation. Such a tracer element design would demonstrate cut-resistance and would maintain jacket integrity and corrosion resistance comparatively longer than prior art copper-clad steel wire, and, therefore, would have a longer service life. In addition, it is highly desirable to have a tracer element for detecting cable and cable paths that has better conductivity and is less expensive to manufacture than prior art steel wire designs. Finally, it is highly desirable to have a tracer element for use in a wide variety of detection applications for detection and location of underground cable, cable paths and routes, underground structures, and underground utility lines, including electrical, gas, water, and sewage lines.

SUMMARY OF THE INVENTION

In general, in one aspect, the invention provides a detectable tracer element for use in detection of underground utility delivery lines or routes comprising a metallic wire, a non-fibrous insulating jacket integral with the wire, and a flexible, cut-resistant, non-electrically shielding woven protective tube surrounding the wire and jacket combination. The woven protective tube includes a plurality of non-metallic fibers woven around the wire and jacket combination such that the combination is disposed within the interior of the protective tube. The wire and jacket combination is positioned within the interior of the woven protective tube such that the wire and jacket combination has a degree of freedom. Implementations of the invention may include one or more of the following features.

The wire may include a solid wire or a stranded wire. The wire may define a gauge in a range of from about 8 AWG (American wire gauge) to about 32 AWG. The metallic wire may include copper or aluminum. The metallic wire being a copper wire may include a tin coating disposed along an exterior surface of the wire. Alternatively, the metallic wire may include one or more metallic compounds.

Implementations of the invention may also include one or more of the following features. The plurality of fibers may include a plurality of warp yarn bundles, a plurality of weft or fill yarns, and one or more lock yarns woven in a substantially oval or circular tube weave. The substantially oval or circular tube weave may include a plurality of binder yarns woven with at least one of any of the plurality of warp yarn bundles and/or any of the plurality of weft or fill yarns to flatten portions of the substantially oval or circular tube weave. The woven protective tube may define a plain weave type.

The woven protective tube may include a plurality of warp yarn bundles, a plurality of weft or fill yarns, which traverse and interlock or interweave with the plurality of warp yarns bundles to hold the bundles together, and one or more lock yarns, which extend longitudinally relative to the length of the plurality of warp yarn bundles, to interlock or interweave portions of edges of the forming weave to join edges of the weave. One or more binder yarns may interweave or interlock with one or more of the plurality of yarns to pull together and to stitch the forming portions of the weave to flatten the weave into a flattened configuration.

Implementations of the invention may include one or more of the following features. The plurality of fibers may include a plurality of warp yarn bundles having a total denier in a range of from about 25,000 to about 270,000. The total denier range of the plurality of warp yarn bundles may include from about 25% to about 95% of the tracer element weight. The plurality of fibers may include synthetic or non-synthetic fibers, and any combinations thereof. The plurality of fibers may include at least one of polyethylene terephthalate (PET), polypropylene, polyethylene, nylon, and/or any combination thereof. At least one of any of the plurality of warp yarn bundles and/or any of the plurality of weft or fill yarns may include a water-blocking coating.

Implementations of the invention may further include one or more of the following features. The insulating jacket may include a double layer insulating jacket including an inner layer disposed along the wire and an outer layer covering the inner layer. The double layer jacket may include an inner layer including polypropylene and an outer layer including nylon. The woven protective tube may also include an outer jacket covering substantially the exterior surface of the tube.

The tracer element may be constructed and arranged for installation in an area of or along underground routes of utility delivery lines of a utility distribution system, the utility delivery lines including at least one of communication cable, fiber optic cable, gas lines, electrical lines, water lines and/or sewage lines.

In general, in another aspect, the invention provides a detectable tracer element for use in detection applications comprising a metallic wire, a non-fibrous insulating jacket covering the wire, and a flexible woven protective tube surrounding the wire and jacket combination. The woven protective tube includes a plurality of fibers woven around the wire and jacket combination such that the combination is disposed within the interior of the woven protective tube.

In general, in a further aspect, the invention provides a method of forming a detectable tracer element for use in detection of underground utility delivery lines or routes. The method comprises providing a metallic wire, forming a non-fibrous insulating jacket along the exterior of and integral with the wire, and weaving a flexible, cut-resistant, non-electrically shielding woven protective tube including a plurality of non-metallic fibers around the wire and jacket combination such that the wire and jacket combination is disposed within the interior of the protective tube.

Implementations of the invention may include one or more of the following features. Weaving a woven protective tube may include weaving a plurality of warp yarn bundles, a plurality of weft of fill yarns, and one or more lock yarns into a substantially oval or circular tube weave. Weaving a woven protective tube may include weaving a plurality of binder yarns with at least one of any of the plurality of warp yarn bundles and/or any of the plurality of weft or fill yarns to flatten portions of the substantially oval or circular tube weave.

Weaving the woven protective tube may also include weaving a plurality of warp yarn bundles with a plurality of weft or fill yarns, which traverse and interlock or interweave with the plurality of warp yarns bundles to hold the bundles together. Weaving may also include weaving one or more lock yarns, which extend longitudinally relative to the length of the plurality of warp yarn bundles, with any of the warp yarn bundles and/or any of the weft or fill yarns to interlock or interweave with portions of edges of the forming weave to join edges of the weave. One or more binder yarns may interweave or interlock with one or more of the plurality of yarns to pull together and to stitch the forming portions of the weave to flatten the weave into a flattened configuration.

Implementations of the invention may also include one or more of the following features. The method may further include applying to at least one of any of the plurality of warp yarn bundles and/or any of the plurality of weft or fill yarns a water-blocking coating. The method may also include applying an outer jacket to the exterior of the woven protective tube.

The invention will be more fully understood after a review of the following figures, detailed description and claims.

BRIEF DESCRIPTION OF THE DRAWINGS

The drawings provided herewith are for purposes of illustrating one or more embodiments of the invention and are not rendered to any particular scale.

DETAILED DESCRIPTION

Figure 1:
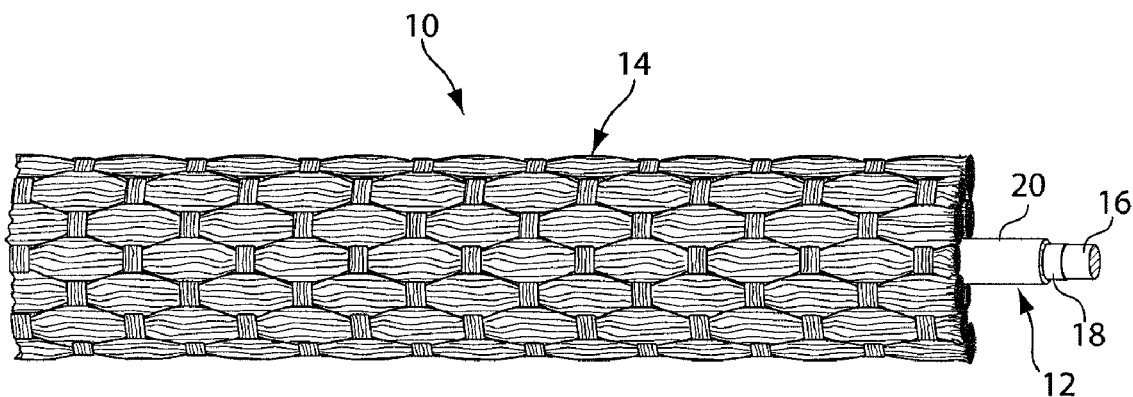
FIG. 1 is a perspective view of a tracer element according to one aspect of the invention.

Referring to FIG. 1, in one aspect, the invention provides a tracer element 10 that is constructed and arranged to serve as a detector for locating underground cable or cable paths and routes. The invention is particularly suited for use in locating direct-buried cable, which includes communications or transmissions cable that are buried under the ground in direct contact with the earth, typically in trenches, without any protective coating, sheathing or cable duct. Such cable includes coaxial and fiber optic cable, and in some instances power cable. However, the tracer element 10 according to the invention may be used with other types of buried cable.

In addition, the tracer element 10 according to the invention may be used in other underground tracing or detecting applications, including detection of underground utility delivery lines and/or routes of underground utility delivery systems, such as communication, cable, gas, electrical, water and sewage delivery lines and/or routes. For purposes of disclosing the invention only, the tracer element 10 is described in relation to its use in detecting underground cable and cable paths and routes. The invention is not limited in this respect and envisions that the tracer element and methods for making same may be used with any of a variety of underground detection applications and underground utility delivery lines and systems.

As shown in FIG. 1, the tracer element 10 includes a metallic wire 16 disposed within an outer woven protective tube 14. The tracer element 10 further includes an outer insulating jacket 20 along the exterior surface of the metallic wire 16 to define the tracer element 10.

The wire 16 is constructed of one or more metals suitable for conducting electrical current that include, but are not limited to, copper or aluminum. The invention is not limited in this respect and envisions that the metallic wire 16 can be constructed of any metal, combination of metals, metal alloys, or metallic compounds that are suitable for conducting electrical current.

The metallic wire 16 can include a solid wire or a stranded wire. The wire 16 is thinner or finer in gauge in comparison to copper-clad steel, and defines a gauge in a range of from about 8 AWG (American wire gauge) to about 32 AWG, and preferably in a range of from about 14 AWG to about 26 AWG. As described in detail below, the woven protective tube 14 provides protection to the wire 16 to permit construction of the wire 16 in a fine gauge in certain embodiments of the invention. In addition, the protective tube 14 provides protection to the wire 16 to help to minimize or to eliminate any damage or corrosion to the wire 16. The tracer element 10 according to the invention eliminates the need for a steel core such as that employed in copper-clad steel wire designs. Therefore, the invention permits use of a fine gauge of the wire 16 and eliminates a steel core to provide a highly flexible tracer element 10. The increased or enhanced flexibility of the tracer element 10 according to the invention facilitates installation of the tracer element 10 by helping to reduce installation time and to minimize problems associated with installation.

In a preferred embodiment of the invention, the tracer element 10 includes the wire 16 constructed substantially of copper as either a single wire or stranded wire. The copper wire 16 provides the tracer element 10 with better conductivity than prior art copper-clad steel wires. With the tracer wire 16 constructed substantially of copper, signals travel along a middle and/or center of the wire 16. The tracer element 10 can thereby carry frequency currents consistently and strongly to enable detection of the tracer element 10 when buried underground using a remote device from an aboveground location.

The wire 16, e.g., copper wire, optionally includes a tin coating 18 along its exterior surface. The tin coating 18 includes tin and related impurities, and coats the wire 16 by any of a number of methods well known in the art. The tin coating 18 may be employed with a copper wire 16 and serves to provide a protective coating to the wire 16 to help to prevent or minimize corrosion.

Figure 2:
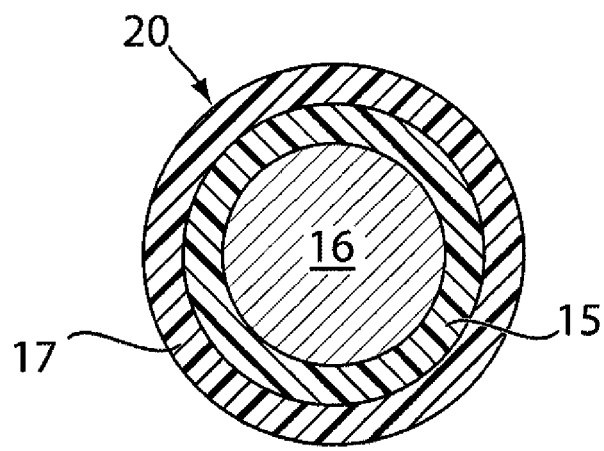
FIG. 2 is a cross sectional view of a metallic wire of the tracer element of FIG. 1.

Referring to FIG. 2, and with further reference to FIG. 1, the insulating jacket 20 surrounds the external surface of the wire 16 to help to provide an impact resistant and protective jacket 20 to the underlying wire 16 and to help to prevent or minimize corrosion of the wire 16. In one embodiment of the invention, the jacket 20 is formed along the external surface of the wire 16 such that the jacket 20 is integral with the wire 16.

The impact resistant jacket 20 is constructed of one or more non-fibrous materials suitable to permit the jacket 20 to deform at a site of impact or applied force along the jacket 20. The ability of the jacket 20 to deform at the impact site helps the jacket 20 to absorb such impact or force and helps to eliminate or at least to reduce splitting of the jacket 20, which helps to prevent or minimize corrosion of the wire 16. In addition, such material(s) help to impart flexibility to the jacket 20.

In one embodiment of the invention, the jacket 20 includes a double layer jacket 20 with an inner layer or jacket 15 disposed along the wire 16 and an outer layer or jacket 17 disposed along the inner layer 15. The inner and outer layers or jackets 15 and 17 provide insulation and impact-resistance to the underlying wire 16 and are cut-resistant to protect the underlying wire 16 from corrosion. The double layer jacket 20 can be constructed of one or more materials suitable for providing the inner and outer layers or jackets 15 and 17 with the noted properties of the jacket 20, including, but not limited to, one or more polymers.

In a preferred embodiment of the invention, the inner layer 15 includes polypropylene and the outer layer 17 includes nylon. Further, in the preferred embodiment of the invention, the inner layer 15 has a thickness of about 0.005 inches, and the outer layer 17 has a thickness of about 0.003 inches.

The invention is not limited in this respect and envisions that each of the inner and outer layers 15 and 17 may be constructed of one or more materials suitable for providing the noted protection properties and for imparting the flexible and deformable properties to the jacket 20 and the tracer element 10. In addition, the invention anticipates that the inner and outer layers 15 and 17 can each define a thickness suitable for a particular application in which the tracer element 10 is applied and is not limited to the disclosed thickness range.

Figure 3:
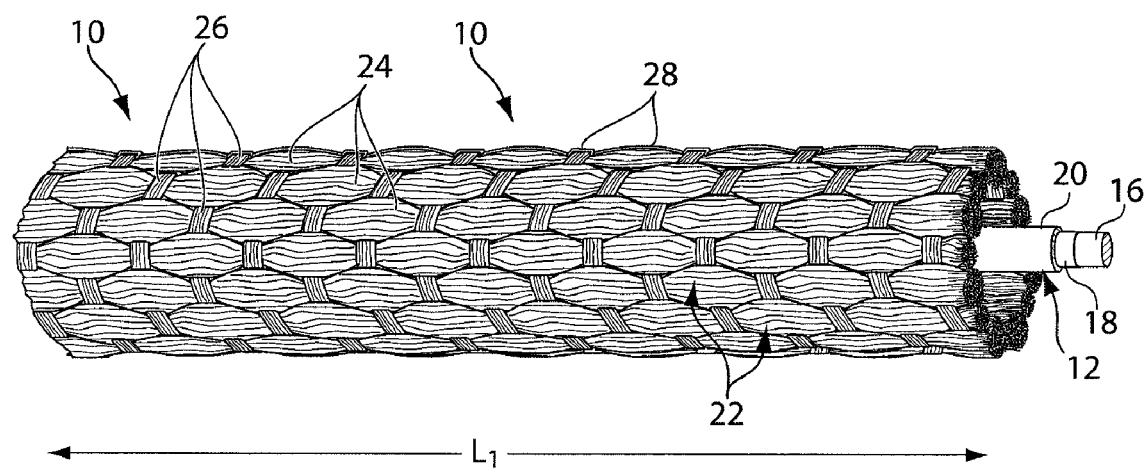
FIG. 3 is a perspective view of the tracer element shown in FIG. 1.
Figure 4:
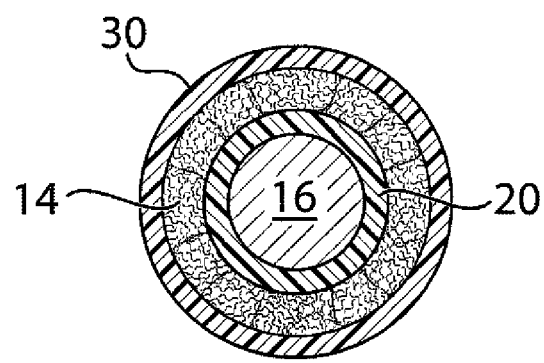
FIG. 4 is a cross sectional view of the tracer element shown in FIGS. 1 and 3 with an outer jacket.

Referring to FIGS. 3 and 4, and with further reference to FIG. 1, the outer woven protective tube 14 according to the invention includes a plurality of yarn fibers 22, e.g., non-metallic, loom-woven with a given weave type, e.g., a plain weave type, into a substantially oval or circular tube weave configuration. The woven tube 14 defines an interior and has a cross-section that has a substantially oval or circular shape, as shown in FIG. 3. During weaving of the woven tube 14, the tube 14 is pulled or stitched along portions of its cross-section, e.g., with binder yarns including fiber and/or metallic binder yarns, to flatten the cross-section of the tube 14 into the flattened configuration shown in FIG. 1. In such configuration, the woven tube 14 may be used in a variety of underground detection applications. The term "tube," as used to disclose the invention, refers to the woven protective tube 14 that defines the substantially oval or circular tube weave that is formed during weaving of a plurality of fibers. The term "tube," however, is not intended to limit the cross-section or the configuration of the woven protective tube 14 and/or the tracer element 10 according to the invention. The invention is not limited in this respect, or to the disclosed weave and cross section configuration, and anticipates that other weaves and cross section configurations are possible.

The woven tube 14 is loom-woven, while the wire 16, and in some configurations of the invention the wire 16 and the jacket 20 combination, is incorporated within the tube 14, such that, the wire 16, or the wire 16 and jacket 20 combination, is disposed within the interior of the tube 14. Preferably, the wire 16, or the wire 16 and jacket 20 combination, is not interwoven with the fibers 22 when the woven tube 14 is completely constructed. The tube 14 is woven around the wire 16, such that, the wire 16, or the wire 16 and jacket 20 combination, is not fixed to the tube 14, but is positioned within the interior of the tube 14 without being woven with any of the yarn fibers 22. The wire 16, or the wire 16 and jacket 20 combination, positioned within the interior of the tube 14 thereby may possess and may exhibit a degree of freedom. The relative degree of freedom helps to prevent or at least to minimize the effects to the wire 16, and/or to the jacket 20, of any force or impact applied along the tube 14 or the tracer element 10. In addition, the configuration of the woven tube 14 helps to trap and to secure the wire 16, or the wire 16 and jacket 20 combination, within the interior of the tube 14 without connection or incorporation of the wire 16, or the wire 16 and jacket 20 combination, with any of the yarn fibers 22. As described below, in another embodiment of the invention, the tube 14 may include the wire 16, or the wire 16 and jacket 20 combination, interwoven with one or more of any of the yarns 22, e.g., binder yarns. In the embodiment of the invention in which the wire 16, or the wire 16 and jacket 20 combination, is not interwoven with any of the yarns 22, the wire 16, or the wire 16 and jacket 20 combination, may possess and may exhibit an additional degree of freedom compared to the wire 16, or the wire 16 and jacket 20 combination, being interwoven with any of the yarns 22.

The denier of the yarn fibers 22 helps to produce a weave configuration that demonstrates sufficient weight and resilience to withstand physical impact along the exterior of the tube 14 and/or the tracer element 10. In one embodiment of the invention, the yarn fibers 22 may include any type of non-metallic fibers including, but not limited to, synthetic fibers, such as polyester fibers and filaments, to form an unshielded woven tube 14 around the wire 16.

In one embodiment of the invention, the woven tube 14 and, more particularly, the non-metallic yarn fibers 22 are non-conductive, or non-electrically conductive or non-electrically shielding. The woven tube 14 constructed of the non-metallic fibers 22 is not electrically conductive nor provides electrical shielding to the wire 16 or the jacketed wire 16.

Synthetic fibers and filaments of the woven tube 14 may include, but are not limited to, polyethylene terephthalate (PET), polyethylene, nylon, or polypropylene fibers and any combination thereof, which are suitable for providing strength and resilience to the tube 14 and thereby to the tracer element 10. In a preferred embodiment of the invention, the synthetic yarn fibers 22 include PET fibers. The invention however is not limited in this respect and envisions that other synthetic or non-synthetic fibers may construct the woven protective tube 14.

The denier of individual fiber yarn units used to make up the yarn fibers 22 of the woven tube 14 may include a range of from about 200 to about 5500 denier per individual fiber yarn unit. The invention is not limited in this respect, or to the disclosed denier ranges of individual fiber yarn units, and anticipates that any of various denier ranges of the individual fiber yarn units are possible.

The denier of the warp yarn units, as described below, may include any of various denier ranges, such that, total denier(s) of warp yarns 24 of the woven protective tube 14 according to the invention may include any of various ranges of total denier(s). In some embodiments of the invention, the total denier(s) of warp yarns 24 may include, but are not limited to, total denier(s) in ranges of from about 25,000 to about 270,000, and up to about 403,000. The total denier ranges of warp yarn bundles 24 would relate to the application in which the tracer element 10 is used. In addition, the total denier ranges of the plurality of warp yarns 24 may include from about 25% to about 95% of the tracer element 10 weight. The invention is not limited in this respect, or to the disclosed total denier ranges of the warp yarns 24, and envisions any of various total denier ranges of the warp yarns 24 to define the woven protective tube 14 according to the invention.

For instance, in one embodiment of the invention shown in FIG. 3, the woven tube 14 includes a plurality of PET fibers 22. The fibers 22 include warp yarns, which have a longitudinal orientation relative to the length $L_1$ of the tube 14, and comprise approximately 8 to 9 yarn packages or bundles 24 having a denier of about 2600 and a total of 84 yarn ends. The plurality of fibers 22 also includes well or fill yarns 26 that traverse the bundles 24 in a criss cross manner, or under and over warp bundles 24, and extend between the bundles 24 to interlock the bundles 24 together. The well or fill yarns 26 have a denier of about 420 and a total of one end, and define from about 4.0 picks per inch to about 10 pick per inch, and preferably about 6.25 picks per inch to produce the woven tube 14. The plurality of fibers 22 also includes one or more lock yarns 28 having a denier of about 420 and a total of one end that extend at a longitudinal orientation relative to the length $L_1$ of the tube. The one or more lock yarns 28 weave and interlock with at least a portion of outer edges of the weave during weaving to join the edges to thereby close the weave, e.g., to form the substantially oval or circular tube weave configuration of the woven tube 14. The plurality of fibers 22 further includes binder yarns (not shown) having a denier of about 420 and a total of two ends which interlock with one or more of the other yarns during formation (weaving) of the tube 14. In one embodiment of the invention, the one or more binder yarns interweave with a given set or unit of any of the yarns 22 to help to pull and to stitch together upper and lower portions of the forming oval or circular tube weave during weaving. The one or more binder yarns thereby help to flatten transversely the substantially oval or circular tube cross-section of the tube 14 into a flattened configuration as shown in FIG. 1. In one embodiment of the invention, the one or more binder yarns interweave with one or more warp yarn bundles 24 and/or one or more weft or fill yarns 26 of the upper and lower portions of the forming tube weave during weaving to stitch and flatten the portions together.

In another embodiment of the invention, the one or more binder yarns interweave with one or more warp yarn bundles 24 and/or one or more weft or fill yarns 26 of the upper and lower portions of the forming tube weave to form wholly or partially a pocket-like structure around the wire 16, or the wire 16 and jacket 20 combination. The wire 16, or the wire 16 and jacket 20 combination, is thereby positioned or set within the pocket-like structure without the wire 16, or the wire 16 and jacket 20 combination, being interwoven or fixed with any binder or other yarns 22.

In a further embodiment of the invention, one or more binder yarns and/or one or more other yarns 22 interweave with a portion of the wire 16, or the wire 16 and jacket 20 combination, during weaving of the substantially oval or circular tube weave. The wire 16, or the wire 16 and jacket 20 combination, is relatively fixed to such binder yarns and/or the other yarns 22.

In one of the preferred embodiments of the tracer element 10 according to the invention, the tracer element 10 includes the woven tube 14 with, the jacketed wire 16 incorporated therein and the plurality of the warp yarn bundles 24 with a total denier in a range of from about 197,600 to about 208,000, and preferably of about 200,000. As mentioned, the invention is not limited in this respect, or to the disclosed total denier ranges of the warp yarn bundles 24, and anticipates that the total denier(s) of the warp yarn bundles 24 may include any of various ranges of total denier(s) to form the woven tube 14 according to the invention.

In addition, the invention is not limited to the number of picks per inch of the weft or fill yarns 26, and the number can be varied to adjust or alter the tightness of the weave, e.g., plain weave, for a particular required or desired application in which the tracer element 10 is applied.

In general, the more yarn fibers 22 that are incorporated within the weave of the woven tube 14, the thicker and wider the weave and the greater the total denier of the woven tube 14 and/or the tracer element 10. The woven tube 14 is configured according to the invention with a total denier that is sufficient to enable the tube 14 to serve as a cut-resistant, absorptive padding around the tracer element 10 or around the wire 16. The fibers 22 absorb and spread along the length of the tracer element 10 any force or impact applied to the tracer element's exterior. The fibers 22 maintain their integrity in response to any force or impact, such that, the woven tube 14 remains uncut and otherwise undamaged and intact in response to such external force or impact along the tracer element 10.

One or more of the yarn types, e.g., weft or fill yarns 26, may be dyed a brilliant color, e.g., orange, such that the tracer element 10 may be visually detected during installation and when placed in the ground. In other configurations of the tracer element 10, the one or more yarn types may be color-coded to denote the type of underground structure that the element 10 is employed to detect.

In one configuration of the tracer element 10 according to the invention, one or more of the warp yarns or bundles 24, the weft or fill yarns 26, the binder yarns, and/or the lock yarns 28 include a layer, a coating, or an application of a water-blocking composition (not shown), which covers at least a portion of the one or more yarns in order that at least some proportion of the yarns 22 exhibit water-blocking capabilities. The water-blocking composition may include a water-resistant and/or a water-absorbent composition. The water-blocking composition helps to impart water-resistant and/or water-absorptive properties to the tracer element 10. In this manner, the tracer element 10 facilitates absorption and/or wicking of water and moisture along the tracer element 10 when the tracer element 10 is exposed to water or to moist conditions. The absorptive or wicking properties that the water-resistant or water-absorptive composition imparts to the tracer element 10 help to prevent or at least minimize corrosion of the wire 16. The water-blocking composition may include, but is not limited to, a water-absorbent composition including a polyacrylate polymer, e.g., polymer precursor in aqueous solution, that is cross-linked when applied to a surface or article. The water-absorbent composition may also include other additives, including, but not limited to, film formers and binders.

Referring to FIG. 4, in another embodiment of the tracer element 10 according to the invention, the tracer element 10 further includes an outer protective jacket 30 disposed along the external surface of the woven tube 14, such that, the tracer element 10 is encased or enclosed within the outer protective jacket 30. The outer protective jacket 30 may be constructed of one or more materials suitable for helping to provide the tracer element 10 with cut-resistance and protective properties, as well as to help to impart or to maintain the deformable and/or flexible properties of the tracer element 10 as described above. Such materials include, but are not limited to, plastics, such as polyethylene. The jacket 30 may or may not be adhered or bonded to the woven tube 14, depending on the one or more materials of construction of the jacket 30 and of the woven tube 14. For a relatively high degree of flexibility, the outer protective jacket 20 may not be adhered or bonded to the woven tube 14.

The tracer element 10 is pliable to the extent it may be supplied as an elongate tape-like structure, such as the flattened configuration shown in FIG. 1, which is stored and supplied on reels or spools. The woven tube 14 may include sequential footage or meter markings printed directly on the tube 14 to assist with measuring and sectioning the tracer element 10 to desired lengths. The width of the tracer element 10 is in a range of from about 0.25 inches to about 0.75 inches. The invention however is not limited in this respect and envisions that the tracer element 10 may define any width for a particular application.

The woven tube 14 configuration according to the invention facilitates the flexibility of the tracer element 10 and, in particular, the flexibility of the wire 16, while providing protection and resilience, such as cut-resistance. As noted above, the wire 16, is surrounded or encased within the woven tube 14, residing within its interior, and is not interwoven with the plurality of fibers 22. This combination and its configuration help to permit the wire 16 with the insulating jacket 20 to exhibit a degree of freedom and to bend readily thereby enhancing its flexibility and the tracer element's 10 flexibility. In addition, the woven tube 14 configuration helps to eliminate or reduce the susceptibility of the tracer element 10 to breach due to an impact along the exterior of the tracer element 10. Such impact can include, for instance, back-fill soil during installation or damage from excavation equipment. As mentioned, the woven tube 14 provides padding along the wire 16 that helps to absorb and spread a force from an impact to the exterior of the woven tube 14, such that, the tube 14 accommodates the impact force and thereby protects the jacket 20 and the wire 12. In this manner, the woven tube 14 helps to maintain the integrity of the jacket 20 and to reduce the susceptibility of the wire 16 to corrosion due to a breach of the jacket 20.

Due to its protective properties, the woven tube 14 permits use of the tracer element 10 with an all copper wire 12 having a fine gauge, e.g., for underground detection applications. Use of an all copper wire 12 ensures consistent and reliable signal conductance along the tracer element 10 that permits use of a range of remote detection devices for locating underground cable and cable paths. A fine gauge of the wire 12 also imparts flexibility to the tracer element 10. As noted above, the flexibility of the tracer element 10 facilitates installation and later excavation of the tracer element 10 by reducing time for and minimizing problems associated with installation and excavation.

Strength Tests of Protective Woven Tube

Various tests were employed to assess the strength and resilience of the woven tube 14 that revealed that the total denier of the tube 14 helps to define the tube's 14 resistance to impact and forces along the exterior of the tracer element 10. One test involves the application of a direct force to the exterior of the woven tube 14 accomplished by dropping a sharp edge directly on the outer surface of the tube 14. For example, in a first test a shovel with a sharp edge was held at about four (4) feet above the woven tube 14 and dropped from this position, such that, the edge of the shovel impacted the tube exterior. The woven tube 14 and the wire 16, or the jacketed wire 12, showed no damage and the woven tube 14 demonstrated resistance in that the weave maintained its integrity. Thereafter, the woven tube 14 similarly showed no damage and demonstrated resistance to several impacts of the shovel edge, and to pressure applied to the shovel edge upon its impact with the woven tube 14. In addition, the wire 16 remained conductive from end-to-end along the impact site.

As another example, a second test involved simulating the effect of back-fill against the woven tube 14 that a tracer element experiences during installation. In this test, a cinder block was dropped from a position at about five (5) feet above the woven tube 14 to contact the exterior of the tube. The woven tube 14 and the wire 16, or the jacketed wire 12, did not show any damage, and the weave of the tube maintained its integrity despite the impact.

In one embodiment of the invention, total denier(s) of the plurality of warp yarn bundles 24 in a range of from about 197,600 to about 208,000, and in a range of from about 98,800 to about 218,400, demonstrate resistance to the tests described above without any compromise or damage to the woven tube 14.

In addition, woven tubes 14 with a higher total denier of the warp yarn bundles 24 including, for instance, a total denier of 270,000 showed similar resistance to the first and second tests.

Further, the woven tube 14 with a lower total denier of the warp yarn bundles 24 of about 163,000 also showed resistance to the impacts of the first and second tests.

The preferred embodiments of the invention having total denier(s) of the warp yarn bundles 24 of from about 25,000 to about 270,000 denier, and from about 197,600 to about 208,000 denier, are further desirable because of the associated reduced manufacturing costs for producing the tracer element 10 with this type of woven tube 14.

The tracer element 10 according to the invention, as mentioned, is constructed and arranged for placement underground in the area of or adjacent utility delivery lines or along delivery line routes, including fiber optic and communications cables and cable routes, as well as gas, electric, water and sewage delivery lines and routes. The tracer element 10 constructions according to the invention enable the tracer element 10 to serve as a direct-buried detection device whereby the tracer element 10 is installed or laid directly in contact with the earth. The tracer element 10 may be laid directly within the utility line routes, e.g., trenches, to locate empty and/or installed routes, or may be laid in the area of or adjacent utility lines or utility line routes. The tracer element 10 may be installed at any depth for a particular detection application and, in particular, for communication cables and cable routes at a depth in a range from about 30 inches to about 48 inches. A portion of each end of a given length of the tracer element 10 is stripped off before or after the tracer element 10 is laid in contact with the earth. Either one or both ends of the tracer element 10 are grounded. When the tracer element 10 is covered with backfill, such that, the length of the tracer element 10 is covered, and an electrical signal/current is applied to the tracer element 10, the wire 16 transmits the applied signal. The wire 16 enables the signal to travel along its length and directly through the earth to an aboveground signal receiver or detection device. As mentioned, use of the wire 16 constructed of copper or substantially of copper helps to reduce or minimize impedance along the wire 16, and helps to enhance or maintain the wire's 16 conductivity. The wire 16 may thereby conduct frequency currents consistently and strongly to enable consistent and reliable signal detection from above ground and over relatively long spans of the tracer element 10.

Figure 5:
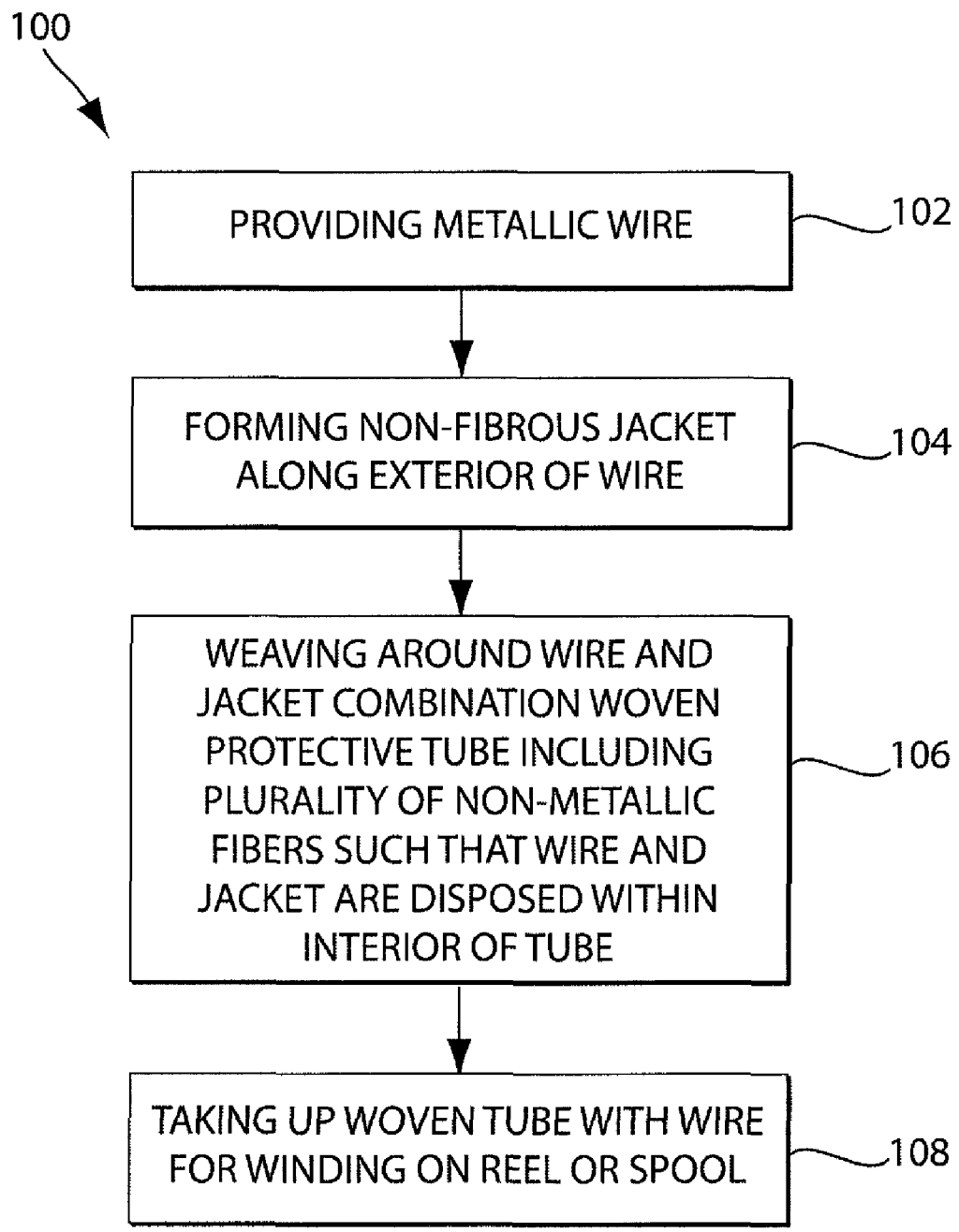
FIG. 5 is a flow diagram of a method of forming the tracer element according to another aspect of the invention.

Referring to FIG. 5, in another aspect, the invention provides a method 100 of forming the detectable tracer element 10 according to the invention and as described above. The method 100, however, is exemplary and is not limited. The method 100 may be altered, e.g., having stages added, removed, or rearranged.

At stage 102, the method includes providing a solid or stranded metallic wire conductor 16, e.g., constructed substantially of copper and having a required or desired gauge.

At stage 104, the method includes forming a non-fibrous jacket 20 along the exterior of the wire conductor 16. In one configuration of the tracer element 10 according to the invention, the jacket is formed along the exterior of the wire 16, such that, the jacket 20 is integral with the wire 16. In one configuration of the jacket 20, the jacket 20 includes a double layer jacket 20. The double layer jacket 20 may include an inner layer including polypropylene and an outer layer including nylon.

At stage 106, weaving a woven protective tube 14 around the wire 16 or around the wire 16 and the jacket 20, such that, the wire 16 or the jacketed wire 16 are disposed within the interior of the tube 14. The wire 16 or the jacketed wire 16 is positioned within the interior of the tube 14 without being interwoven with any of the plurality of yarns 22. In one embodiment of the invention, weaving the woven protective tube 14 includes weaving a plurality of non-metallic fibers suitable for producing the tube 14 having flexibility and demonstrating cut-resistance. In another embodiment of the invention, weaving the woven protective tube 14 includes weaving a plurality of non-metallic fibers suitable for producing the tube 14 as a non-electrically shielding tube 14 without electrical shielding properties or electrical conductance. In a further embodiment of the invention, weaving the woven protective tube 14 includes weaving a plurality of non-metallic fibers suitable for producing the tube 14 as an unshielded tube 14.

In another embodiment of the invention, weaving the woven protective tube 14 includes weaving a plurality of warp yarn bundles 24 with a plurality of weft or fill yarns 26 and a plurality of lock yarns 28 in a particular weave type, e.g., a plain weave, to define the woven tube 14 with a particular cross section, e.g., a substantially oval or circular tube weave. Weaving the tube 14 may further include weaving a plurality of binder yarns with at least of one or more of the warp yarn bundles 24 and/or one or more of the weft of fill yarns 26 to pull and to stitch portions of the cross-section of the forming weave, e.g., oval or circular tube weave, together, such that, the binder yarns flatten portions of the cross-section of the tube weave into a flattened configuration as shown in FIG. 1.

In another configuration of the method 100 according to the invention, the method further includes providing any of the warp yarn bundles 24 and/or any of the weft or fill yarns 26 with a layer, a coating, or an application of a water blocking composition that at least partially covers one or more of such yarns 24 and 26. The coating helps to impart water-resistant and/or water-absorptive properties to such yarns 24 and 26. Applying the water blocking composition can be performed prior to weaving the one or more yarns 24 and 26 and/or after formation of the tube 14.

At stage 108, taking up the woven tube 14 with the wire 16 and jacket 20 combination, or only the wire 16, to a winding device for winding the tracer element 10 on a reel or spool.

Figure 6:
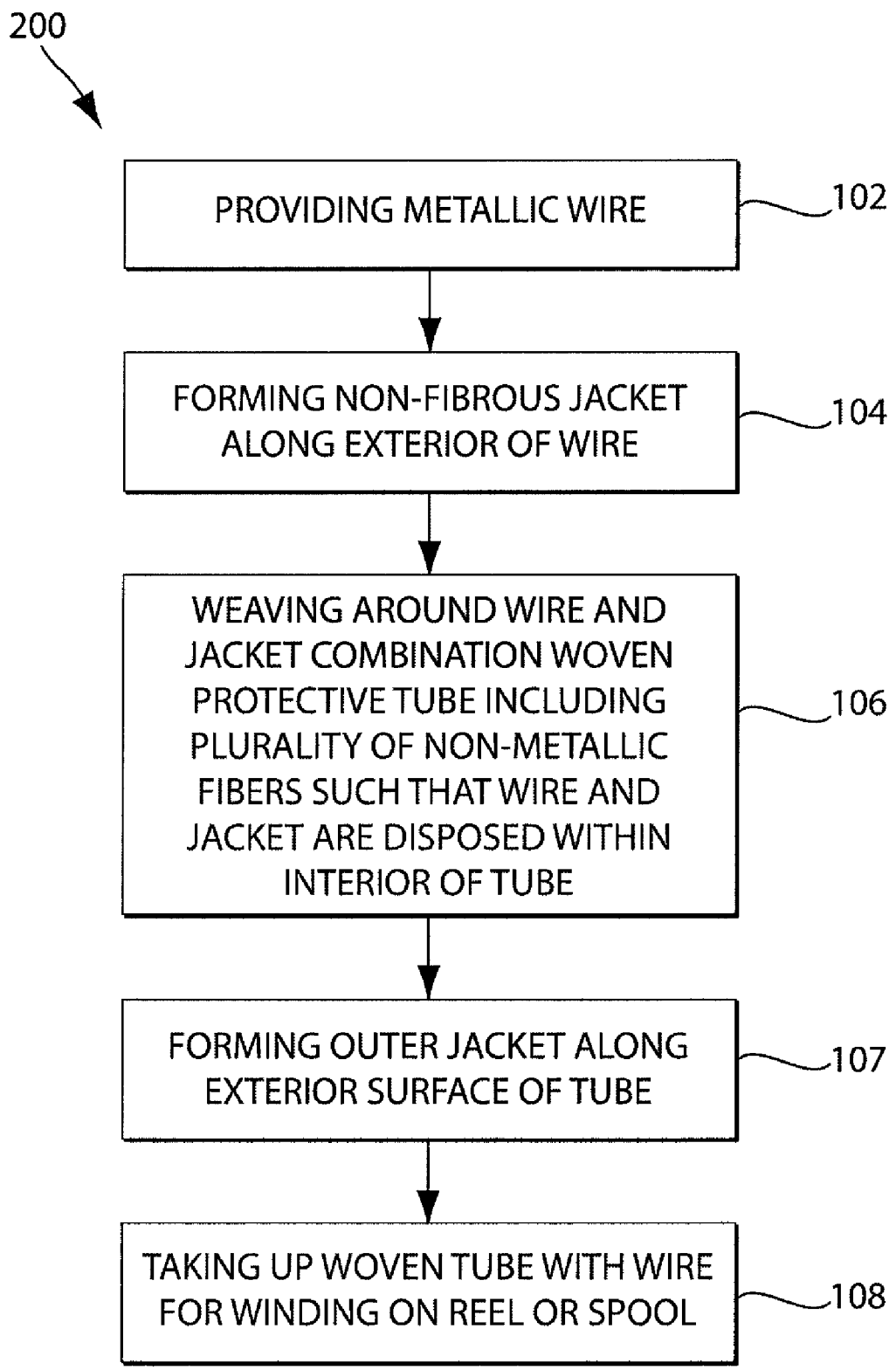
FIG. 6 is a flow diagram of a method of forming the tracer element according to a further aspect of the invention.

Referring to FIG. 6, in another aspect, the invention provides another method 200 of forming the detectable tracer element 10 according to the invention and as described above. The method 200, however, is exemplary and is not limited. The method 200 includes the stages 102 thru 106 noted and described above, and further includes the stage described below. The method 200 may be altered, e.g., having stages added, removed, or rearranged.

At stage 107, before stage 108, the method 200 includes forming an outer protective jacket 30 along the external surface of the woven tube 14.

Having thus described at least one illustrative aspect of the invention, various alterations, modifications and improvements will readily occur to those skilled in the art. Such alterations, modifications and improvements are intended to be within the scope and spirit of the invention. Accordingly, the foregoing description is by way of example only and is not intended as limiting. The invention's limit is defined only in the following claims and the equivalents thereto.

What is claimed is:

1. A detectable tracer element for use in detection of underground utility delivery lines or routes comprising:
   a metallic wire configured to conduct an electrical signal for detection by an aboveground signal detector;
   a non-fibrous insulating jacket integral with the wire;
   a flexible, cut-resistant, non-electrically shielding woven protective tube surrounding the wire and jacket combination, the woven protective tube including a plurality of non-metallic fibers woven around the wire and jacket combination such that the combination is disposed within the interior of the protective tube;
   the plurality of non-metallic fibers including a plurality of warp yarn bundles, one or more weft or fill yarns, and one or more lock yarns, woven in a substantially oval or circular tube weave; and
   the woven protective tube including an upper portion and a lower portion of said warp yarn bundles having a longitudinal orientation relative to the length of the woven tube,
   wherein the substantially oval or circular tube weave includes one or more binder yarns woven with at least one of: one or more of said warp yarn bundles and one or more weft or fill yarns, to flatten portions of the substantially oval or circular tube weave.

2. The detectable tracer element of claim 1 wherein the metallic wire includes copper or aluminum.

3. The detectable tracer element of claim 2 wherein the copper wire includes a tin coating disposed along an exterior surface of the wire.

4. The detectable tracer element of claim 1 wherein the plurality of fibers includes at least one of: polyethylene terephthalate (PET), polypropylene, polyethylene, nylon, and any combination thereof.

5. The detectable tracer element of claim 1 wherein said plurality of warp yarn bundles includes a total denier in a range of from about 25,000 to about 270,000.

6. The detectable tracer element of claim 1 wherein the insulating jacket includes a double layer insulating jacket including an inner layer disposed along the wire and an outer layer covering the inner layer.

7. The detectable tracer element of claim 6 wherein the insulated double layer jacket includes an inner layer including polypropylene and an outer layer including nylon.

8. The detectable tracer element of claim 1 wherein the wire defines a gauge in a range of from about 8 AWG to about 32 AWG.

9. The detectable tracer element of claim 1 wherein the wire includes a solid wire or a stranded wire.

10. The detectable tracer element of claim 1 wherein the wire and jacket combination is positioned within the interior of the woven protective tube such that the wire and jacket combination has a degree of freedom.

11. The detectable tracer element of claim 1 wherein at least one of: any of said warp yarn bundles and any of said weft or fill yarns include a water-blocking coating.

12. The detectable tracer element of claim 1 wherein the woven protective tube includes an outer jacket covering substantially the exterior surface of the tube.

13. The detectable tracer element of claim 12 wherein the outer jacket includes a protective jacket configured against the woven protective tube to prevent dislocation of the woven protective tube.

14. The detectable tracer element of claim 1 wherein the tracer element is configured for installation in an area of or along underground routes of utility delivery lines of a utility distribution system, the utility delivery lines including at least one of: communication cable, fiber optic cable, gas lines, electrical lines, water lines and sewage lines.

15. A method of forming a detectable tracer element for use in detection of underground utility delivery lines or routes, the method comprising:
   providing a metallic wire configured to conduct an electrical signal for detection by an aboveground signal detector;
   forming a non-fibrous insulating jacket along the exterior of and integral with the wire; and
   weaving a flexible, cut-resistant, non-electrically shielding woven protective tube including a plurality of non-metallic fibers around the wire and jacket combination such that the wire and jacket combination is disposed within the interior of the protective tube, wherein the plurality of non-metallic fibers includes a plurality of warp yarn bundles, one or more weft or fill yarns, and one or more lock yarns, woven in a substantially oval or circular tube weave; and
   the woven protective tube including an upper portion and a lower portion of said warp yarn bundles having a longitudinal orientation relative to the length of the woven tube, and
   the substantially oval or circular tube weave including one or more binder yarns woven with at least one of: one or more of said warp yarn bundles and one or more weft or fill yarns, to flatten portions of the substantially oval or circular tube weave.

16. The method of claim 15 wherein at least one of: any of said warp yarn bundles and any of said weft or fill yarns include a water-blocking coating.

17. The method of claim 15 further comprising applying an outer jacket to the exterior of the woven protective tube.

* * * * *